(12) United States Patent
Hantke

(10) Patent No.: US 7,261,048 B1
(45) Date of Patent: Aug. 28, 2007

(54) PARALLEL LINK TRAILING ARM FOR SEEDERS

(75) Inventor: Glenn Hantke, St. Brieux (CA)

(73) Assignee: Bourgault Industries Ltd., St. Brieuk, Saskatchewan (CA)

( * ) Notice: Subject to any disclaimer, the term of this patent is extended or adjusted under 35 U.S.C. 154(b) by 0 days.

(21) Appl. No.: 11/407,254

(22) Filed: Apr. 19, 2006

(30) Foreign Application Priority Data

Nov. 30, 2005 (CA) .................... 2528468

(51) Int. Cl.
- A01B 49/04 (2006.01)
- A01C 5/00 (2006.01)
- A01C 7/00 (2006.01)
- A01C 7/18 (2006.01)
- A01C 9/00 (2006.01)

(52) U.S. Cl. .......................... 111/56; 111/136; 111/151; 111/156; 111/187; 172/264; 172/678; 172/748

(58) Field of Classification Search ................ 111/157, 111/163–169, 186–196, 52–56, 62, 134–136, 111/147, 151, 156; 172/263–265, 677–680, 172/748
See application file for complete search history.

(56) References Cited

U.S. PATENT DOCUMENTS

| | | | |
|---|---|---|---|
| 4,760,806 A | 8/1988 | Bigbee | |
| 5,161,472 A | 11/1992 | Handy | |
| 5,333,559 A | 8/1994 | Hodapp et al. | |
| 5,351,635 A | 10/1994 | Hulicsko | |
| 5,396,851 A | 3/1995 | Beaujot | |
| 5,520,125 A | 5/1996 | Thompson | |
| 5,562,054 A | 10/1996 | Ryan | |
| 5,609,114 A | 3/1997 | Barton | |
| 6,325,156 B1 | 12/2001 | Barry | |
| 6,408,772 B1 | 6/2002 | Lempriere | |
| 2006/0162632 A1* | 7/2006 | Bourgault et al. | 111/200 |

* cited by examiner

*Primary Examiner*—Christopher J. Novosad
(74) *Attorney, Agent, or Firm*—Frost Brown Todd LLC

(57) ABSTRACT

A furrow opener apparatus includes a parallel link trailing arm having a rear link that is maintained substantially horizontal as the arm moves up and down. Front and rear furrow openers are attached to the rear link. A packer wheel arm is attached to the rear link and extends rearward and downward from the rear link, and a packer wheel is mounted to the packer wheel arm and aligned with one of the furrow openers. A bias device exerts a downward bias force on the trailing arm, furrow openers, and packer wheel. The furrow openers, the packer wheel, and the rear link are maintained in rigid orientation with respect to each other when in a working mode, and a vertical operating position of at least one of the furrow openers with respect to the packer wheel is adjustable to vary a depth of the furrow.

26 Claims, 7 Drawing Sheets

PARALLEL LINK TRAILING ARM FOR SEEDERS

BACKGROUND OF THE INVENTION

This invention relates to agricultural implements and more specifically to a parallel arm apparatus for attaching a seed or fertilizer knife to a seeder frame.

BACKGROUND OF THE INVENTION

Agricultural seeders are used to place seed and fertilizer in the soil to plant a crop. It is necessary to place the seed at a substantially consistent depth beneath the surface of the soil. Opener arms of various configurations typically extend downward from the seeder frame and a seed furrow opener is mounted on the opener arm and adapted to engage the soil to make a seed furrow into which the seed is deposited. Typically the furrow opener pushes soil to one or both sides and seed is deposited close behind the furrow opener so that the pushed aside soil can then fall back in on top of the seed. A packer wheel is typically provided following the seed furrow opener and oriented to roll over the seed furrow to pack the soil that has fallen back over the seed and encourage seed germination.

The desired seed depth is typically relatively shallow, from less than one inch with some seeds and soil conditions up to three inches or more in others. Since agricultural seeders are commonly 50 or more feet wide and can include 60 or more individual seed furrow openers, consistently maintaining seed depth for each furrow opener in a range of fractions of an inch presents a considerable challenge.

In order to maintain consistent seed depth, it is known to pivotally attach the front end of a trailing arm to the seeder such that same extends generally rearward and downward from the frame and can pivot up and down with respect to the seeder frame. A packer wheel is then rotatably attached to support the rear end of the trailing arm. A seed furrow opener is attached to the trailing arm ahead of the packer wheel such that the vertical position of the bottom of the seed furrow opener with respect to the bottom of the packer wheel can be fixed at a desired location to set the depth of the seed furrow. A bias element is provided to push or pull downward on the trailing arm to engage the seed furrow opener in the soil and force the packer wheel against the ground. The furrow opener assemblies are spaced laterally along the width of the implement by mounting the front ends of the trailing arms to lateral frame members of the implement.

The packer wheel pushes down the soil over the seed in the seed furrow and the bottom of the packer wheel corresponds to the soil surface. The depth of the seed furrow is substantially determined by the vertical distance that the bottom end of the seed furrow opener extends below the bottom of the packer wheel. Such a trailing arm seed furrow opener assembly is disclosed for example in U.S. Pat. No. 5,609,114 to Barton, particularly in FIG. 4B thereof.

Seeders are well known that deposit seed and fertilizer in the soil at the same time. Such seeders can be configured to deposit the seed and fertilizer in the same location or furrow when the amount of fertilizer being deposited is relatively low. With higher fertilizer rates it is required to separate the seed furrow from the fertilizer furrow to avoid damage to the seed that is commonly known to be caused by proximity to larger amounts of fertilizer. The seeder must then also be configured to maintain the seed and fertilizer at consistent locations with respect to each other as well as with respect to the soil surface although the depth of fertilizer placement in the soil is generally considered to not be as critical as seed depth, since the plant roots will reach the fertilizer so long as it is generally close to the seed.

The Barton U.S. Pat. No. 5,609,114 thus also discloses the addition of a fertilizer furrow opener on the trailing arm. A forward disc furrow opener forms a fertilizer furrow, and a rear disc furrow opener nearest to the packer wheel forms a seed furrow above and to one side of the fertilizer furrow to provide separation between the seed and fertilizer.

Similarly, U.S. Pat. No. 5,396,851 to Beaujot discloses a furrow opener assembly like that of Barton with a trailing arm supported by a packer wheel and a hoe-type rear seed furrow opener attached to the trailing arm near the packer wheel and also including a hoe-type front fertilizer furrow opener attached to the trailing arm. The Beaujot apparatus also deposits seed in a seed furrow generally above and to one side of the fertilizer furrow.

A problem occurs with trailing arm furrow opener assemblies such as that of Barton and Beaujot in uneven terrain where the distance between the frame and the ground varies. As the vertical distance of the frame above the ground varies the trailing arm moves up and down about its pivotal attachment to the seeder and the angle of the trailing arm changes and the actual depth of the seed furrow varies. This variation is minimized by locating the seed furrow opener as close as possible to the packer wheel. If in fact the seed furrow opener could be moved back to coincide with the bottom of the packer wheel the problem would not arise at all.

Some seeders, such as that disclosed in U.S. Pat. No. 4,760,806 to Bigbee do provide a depth controlling gauge wheel mounted to a bracket holding the seed furrow opener and directly beside the seed furrow opener such that the depth control wheel directly determines the depth of the seed furrow. A separate packer wheel or like packing means must then be provided since the gauge wheel is beside the seed furrow.

Placing the rear seed furrow opener close to the packer wheel reduces the time available for soil to fall back into the seed furrow on top of the seed before being packed by the packer wheel. Thus operating speeds must be kept fairly low to allow time for the soil to fall back into the seed furrow before the packer wheel arrives. Thus placing the seed furrow opener close to the packer wheel improves the consistency of the seed furrow depth, but reduces operating speed. While variations in seed furrow depth are minimized, the depth of the fertilizer furrow made by the fertilizer furrow opener located well in front of the seed furrow opener varies significantly in rolling terrain. While fertilizer depth is not as critical as seeding depth, excessive depth is not required or desirable, and also greatly increases the force required to pull the fertilizer furrow opener through the soil, wasting fuel. In some uneven terrain the separation distance between the seed and fertilizer furrows will be reduced at some locations, such that fertilizer damage to the seed can occur in those locations.

Parallel link mechanisms are used in seeders to maintain various furrow opener assemblies or portions thereof in a parallel relationship as they move up and down. For example U.S. Pat. Nos. 5,161,472 to Handy and 5,562,054 to Ryan show furrow opener assemblies with front and rear furrow openers. The rear furrow opener is attached by a parallel link mechanism to a downward extending shank to which the front furrow opener is attached. The rear furrow opener is fixed relative to a packer wheel, and forced down toward the ground by a spring bias element. Thus the depth of penetration of the front furrow opener varies as the front furrow opener shank moves with the frame up and down with respect to the ground surface in rolling terrain, however the rear furrow opener and packer wheel move up and down together with the packer wheel maintaining contact with the ground maintaining a consistent depth for the furrow formed by the rear furrow opener.

The parallel link mechanism maintains the bottom of the packer wheel and the bottom of the rear furrow opener substantially at the same relative level, such that there is little variation in the depth of the seed furrow as the vertical position of the parallel link mechanism varies. The gauge wheel does not control the vertical position of the front furrow opener and shank which typically is pivotally attached to the seeder such that same can move with respect to the seeder.

U.S. Pat. No. 6,408,772 to Lempriere discloses a blade mounted on a parallel link mechanism. Conduits are defined inside the blade to separately dispense seed, fertilizer, water, and the like through different locations from front to rear and laterally along the bottom of the blade. Although no packer wheel is shown in the Lempriere patent, in production models it is known to mount a packer wheel on the parallel link mechanism behind the blade to pack and control depth as discussed above. Since the blade is a single unit, the depth adjustment provided by the packer wheel is the same for all products dispensed by the blade.

Parallel link mechanisms are also known for mounting row crop and cultivating units or rigs on an implement frame, for example as disclosed in U.S. Pat. Nos. 6,325,156 to Barry, 5,520,125 to Thompson, and 5,333,559 to Hodapp et al. These units comprise generally a front gauge wheel or wheels and a following ground engaging tool such as a furrow opener or sweep. A bias element forces the parallel link mechanism downward.

U.S. Pat. No. 5,351,635 to Hulicsko discloses a support frame mounted to a seeder frame by a parallel link mechanism and supported by a front wheel and two rear packer wheels. A bias element forces the support frame down toward the ground. A furrow opener shank is pivotally attached to the support frame so as to be able to move up and down independent of rear packer wheels and a further bias element exerts a force on the shank urging it downward.

SUMMARY OF THE INVENTION

It is an object of the present invention to provide a furrow opener apparatus that overcomes problems in the prior art.

In a first embodiment the invention provides a furrow opener apparatus adapted for attachment to a lateral frame member of an implement for travel over the ground in an operating travel direction. The apparatus comprises a parallel link trailing arm comprising a front link adapted for substantially fixed attachment to the lateral frame member, a rear link, and upper and lower parallel arm members pivotally attached to the front and rear links such that the rear link is maintained substantially horizontal as the upper and lower arm members move up and down. Front and rear furrow opener brackets are attached to the rear link, and front and rear furrow openers are attached to corresponding lower portions of the front and rear furrow opener brackets, the front and rear furrow openers operative to form corresponding front and rear furrows when bottom ends thereof are engaged in the ground. A packer wheel arm is attached to the rear link and extends rearward and downward from the rear link, and a packer wheel is rotatably mounted to a rear portion of the packer wheel arm such that the packer wheel is substantially aligned with one of the front furrow opener and the rear furrow opener. A bias device is operative to exert a downward bias force on the trailing arm, front and rear furrow opener brackets, and packer wheel. The front and rear furrow openers, the packer wheel, and the rear link are maintained in substantially rigid orientation with respect to each other when in a working mode, and a vertical operating position of at least one of the front furrow opener and the rear furrow opener with respect to the packer wheel is adjustable to vary a depth of a corresponding furrow.

In a second embodiment the invention provides a seeding and fertilizing apparatus comprising an implement frame mounted on wheels for travel over the ground in an operating travel direction and comprising a lateral frame member. A parallel link trailing arm comprises a front link attached substantially rigidly to the lateral frame member, a rear link, and upper and lower parallel arm members pivotally attached to the front and rear links such that the rear link is maintained substantially horizontal as the upper and lower arm members move up and down. A front furrow opener bracket is attached to the rear link, and a front furrow opener is attached to a lower portion of the front furrow opener bracket and is operative to form a first furrow when a bottom end thereof is engaged in the ground. A rear furrow opener bracket is attached to the rear link, and a rear furrow opener is attached to a lower portion of the rear furrow opener bracket and is operative to form a second furrow when a bottom end thereof is engaged in the ground. A packer wheel arm is attached to the rear link and extends rearward and downward from the rear link, and a packer wheel is rotatably mounted to a rear portion of the packer wheel arm such that the packer wheel is substantially aligned with one of the front and rear furrow openers. A bias device is operative to exert a downward bias force on the trailing arm, front and rear furrow opener brackets, and packer wheel. The front and rear furrow openers, the packer wheel, and the rear link are maintained in substantially rigid orientation with respect to each other when in a working mode, and a vertical operating position of at least one of the front and rear furrow openers with respect to the packer wheel is adjustable to vary a depth of an aligned one of the first and second furrows.

The parallel link trailing arm maintains the furrow openers in a consistent orientation with respect to a depth controlling packer wheel such that when the angle of the trailing arm changes as the implement moves through uneven terrain the depth of furrows made by the furrow openers remains substantially constant. In addition to maintaining a constant furrow depth, the furrow openers can be moved farther ahead of the packer wheel to allow more time for soil to fall back into the furrow before the packer wheel packs the furrow and to allow increased operating speeds.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
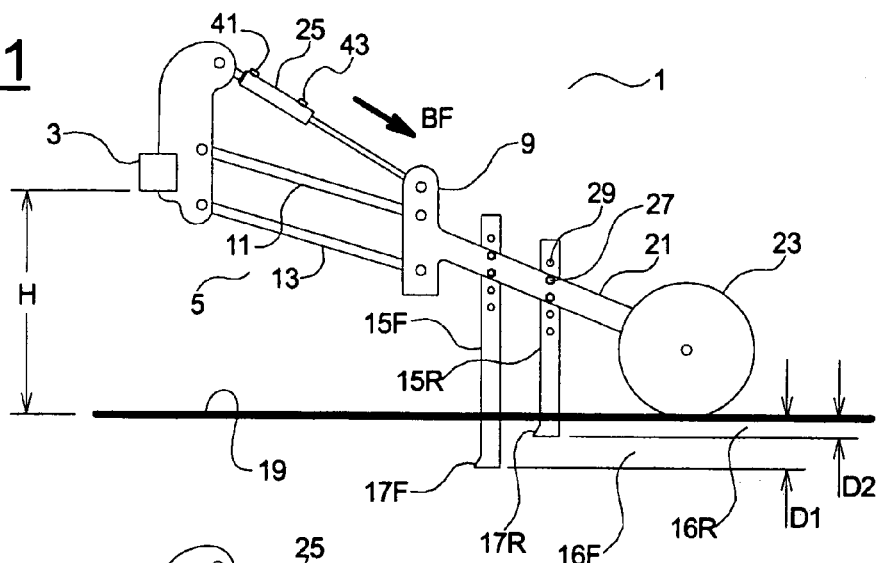
FIG. 1 is a schematic side view of an embodiment of the present invention in a first working position with the implement frame a distance H above the ground, and wherein the rear furrow opener makes a shallower furrow and is aligned with the packer wheel.
Figure 2:
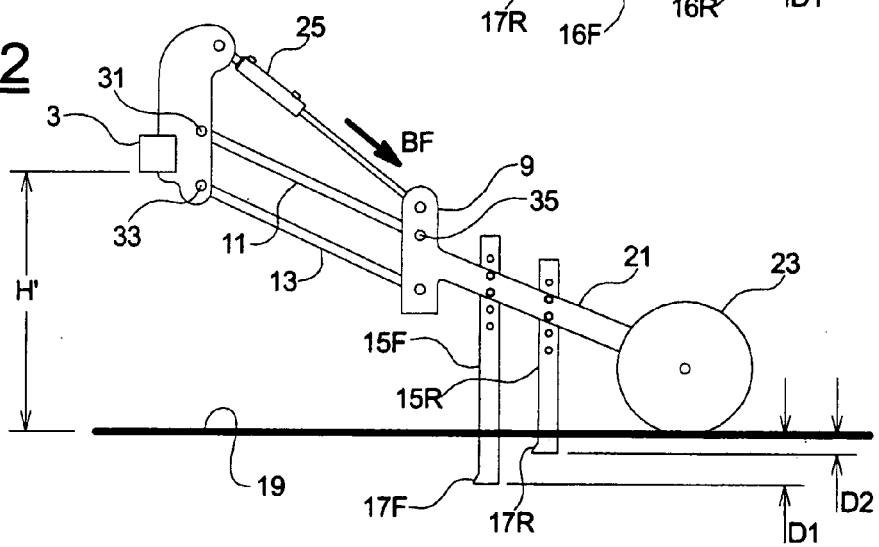
FIG. 2 is a schematic side view of the embodiment of FIG. 1 in a second working position with the implement frame an increased distance H' above the ground.
Figure 3:
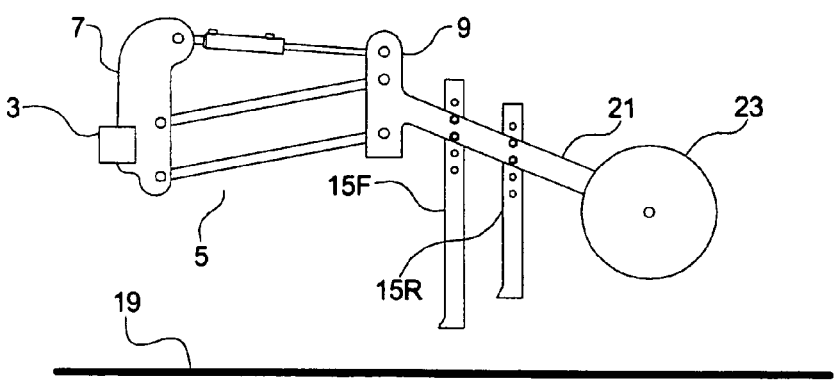
FIG. 3 is a schematic side view of the embodiment of FIG. 1 in a transport position.

FIGS. 1-3 schematically illustrate a furrow opener apparatus 1 of the present invention adapted for attachment to a lateral frame member 3 of an implement frame mounted on wheels or the like for travel over the ground in an operating travel direction T. The apparatus 1 comprises a parallel link trailing arm 5 comprising a front link 7 adapted for substantially fixed attachment to the lateral frame member 3 and a rear link 9. Upper and lower parallel arm members 11, 13 are pivotally attached to the front and rear links 7, 9 such that the rear link 9 is maintained substantially horizontal as the upper and lower arm members 11, 13 move up and down with respect to the frame 3 as illustrated in FIGS. 1 and 2.

Front and rear furrow opener brackets 15F, 15R are attached to the rear link 9, and corresponding furrow openers 17F, 17R are attached to lower portions of the furrow opener brackets 15F, 15R and are operative to form corresponding furrows 16F, 16R when bottom ends thereof are engaged in the ground 19.

A packer wheel arm 21 is attached to the rear link 9 and extends rearward and downward from the rear link 9. A packer wheel 23 is rotatably mounted to a rear portion of the packer wheel arm 21 such that the packer wheel 23 is substantially aligned with one of the furrow openers 17F, 17R. A bias device, illustrated as a hydraulic cylinder 25, is operative to exert a downward bias force BF on the trailing arm 5, furrow opener brackets 15F, 15R, and packer wheel 23.

The hydraulic cylinder 25 in the embodiments of FIGS. 1-3 is connected to an active hydraulic source at a first port 41 thereof when in working mode. The active hydraulic source is operative to maintain a substantially constant pressure in the hydraulic cylinder 25 to exert a substantially constant downward bias force BF on the trailing arm 5, furrow opener brackets 15F, 15R, and packer wheel 23 while allowing the hydraulic cylinder 25 to extend and retract in response to forces exerted on the trailing arm 5. The hydraulic cylinder is connected to the active hydraulic source at a second port 43 thereof when in transport mode such that the active hydraulic source is operative in transport mode to raise the trailing arm 5, furrow opener brackets 15F, 15R, and packer wheel 23 to a transport position as illustrated in FIG. 3.

Thus the furrow opener apparatus 1 can be mounted to an implement having a frame mounted on fixed wheels since the hydraulic cylinder 25 is operative to raise the furrow openers for transport. The apparatus 1 could also be mounted to an implement where the wheels move up and down with respect to the frame to raise and lower the frame and furrow openers between the working and transport position. The bias element of the furrow opener apparatus 1 of the invention could then be provided by a spring or the like, since it would not be required to exert an upward force on the trailing arm 5 to raise the furrow openers for transport.

The furrow openers 17F, 17R, the packer wheel 23, and the rear link 9 are maintained in substantially rigid orientation with respect to each other when in a working mode during operations in a field. In the simple embodiment of FIGS. 1 and 2, this is accomplished by rigidly attaching, such as by welding or bolting, the packer wheel arm 21 to the rear link 9. The furrow opener brackets 15F, 15R are then rigidly attached to the packer wheel arm 21 by bolts 27. The packer wheel 23 controls the depth of the furrows 16F, 16R and the vertical operating position of the furrow openers 17F, 17R with respect to the packer wheel 23 is made adjustable to vary a depth of the furrow by providing a plurality of holes 29 through which the bolts 27 can be inserted to fix one of, or as illustrated both of, the furrow opener brackets 15F, 15R to the packer wheel arm 21. Where both of the furrow opener brackets 15F, 15R are so attached, the depth of each furrow 16F, 16R can be individually varied.

The front link 7 defines upper and lower front pivot axes 31, 33 and the rear link 9 defines upper and lower rear pivot axes 35, 37, and the attachment to the lateral frame member 3 is such that the upper and lower front and rear pivot axes 31, 33, 35, 37 are oriented substantially horizontal and perpendicular to the operating travel direction T. The upper arm member 11 is pivotally attached to the front link 7 about the upper front pivot axis 31 and pivotally attached to the rear link 9 about the upper rear pivot axis 35. The lower arm member 13 is pivotally attached to the front link 7 about the lower front pivot axis 33 and is pivotally attached to the rear link 9 about the lower rear pivot axis 37 such that the upper and lower arm members 11, 13 are oriented substantially parallel to each other.

Thus when the parallel arm members 11, 13 move up and down the rear link 9 is maintained in the substantially the same horizontal orientation through the vertical range of motion without tilting forward or rearward. For example FIG. 1 illustrates the apparatus 1 in a first working position where the frame member 3 is a distance H above the ground 19 while FIG. 2 illustrates the apparatus 1 in a second working position where the frame member 3 is an increased distance H' above the ground 19. By maintaining the rear link 9 in the same horizontal orientation in all working positions, the packer wheel 23 and furrow openers are also maintained in the same horizontal orientation such that the vertical distance between the bottom of the furrow openers 17F, 17R and the bottom edge of the packer wheel 23 stays substantially constant through the range of vertical motion, and the depth D1 and D2 of the furrows 16F, 16R remains constant.

Furrow opener apparatuses having front and rear furrow openers with depth control provided by a single packer wheel are known in the art for depositing seed and fertilizer in separate furrows. In contrast to the operation of the embodiment of the present invention illustrated in FIGS. 1-3, FIG. 6 illustrates the operation of a conventional prior art trailing arm furrow opener assembly where the packer wheel 123 is attached to the end of the trailing arm 121 that is pivotally attached at the front end thereof to the lateral frame member 103 at pivotal connection point PC. The front and rear furrow opener brackets 115F, 115R are attached to the trailing arm 121 between the packer wheel 123 rolling along the ground 119 and the pivotal connection point PC. In rolling terrain the lateral frame member 103 and thus the pivotal connection point PC move up and down with respect to the ground 119 while the packer wheel substantially stays at ground surface. As illustrated, the furrow opener brackets 115F, 115R also move up and down and thus the depth of the furrows made by the furrow openers on the furrow opener brackets 115F, 115R varies. As the lateral frame member 103 moves down a distance DH with respect to the ground 119, the depth of the furrow made by the front furrow opener increases by amount DF1 and the depth of the furrow made by the rear furrow opener increases by a lesser amount DF2. Thus the variation decreases as the furrow opener moves closer to the packer wheel 123. It can thus be seen that conventionally it is desirable to place the more depth sensitive seed furrow opener nearest to the packer wheel where variations are reduced, and the less depth sensitive fertilizer furrow opener ahead of the seed furrow opener.

The illustrated embodiment of FIGS. 1-3 shows the furrow 16R made by the rear furrow opener 17R as penetrating less far into the ground than the furrow 16F made by the front furrow opener 17F. This is the conventional arrangement where the shallower seed furrow is closest to the packer wheel 23 which is aligned with the seed furrow opener. It is not generally required to pack a furrow into which only fertilizer is placed. With the furrow opener apparatus 1 of the invention however the rear furrow opener 17R can be moved farther ahead of the packer wheel 23 since proximity to the packer wheel is not required in order to reduce variations in furrow depth. Increasing the separation between the seed furrow opener and the packer wheel increases the time between forming and packing the furrow, and provides added time for soil moved aside when forming the furrow to fall back into the furrow on top of the seed prior to packing. Thus operating speeds can be increased as the distance between the seed furrow opener and packer wheel increases.

Figure 4:
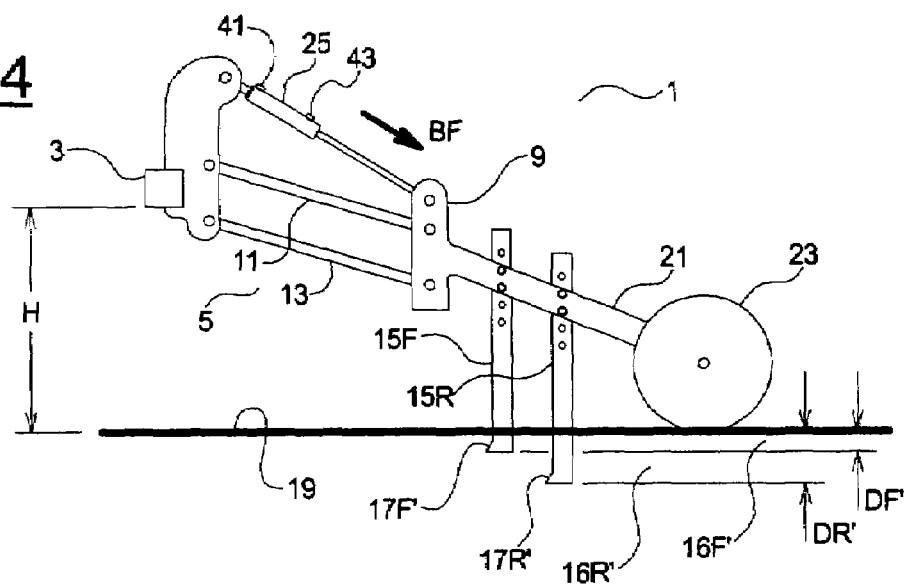
FIG. 4 is a schematic side view of the embodiment of FIG. 1 wherein the front furrow opener makes a shallower furrow and is aligned with the packer wheel.
Figure 5:
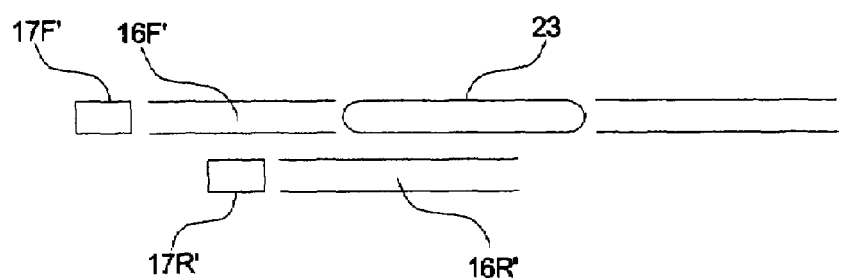
FIG. 5 is a schematic top view of the apparatus of FIG. 4.
Figure 6:
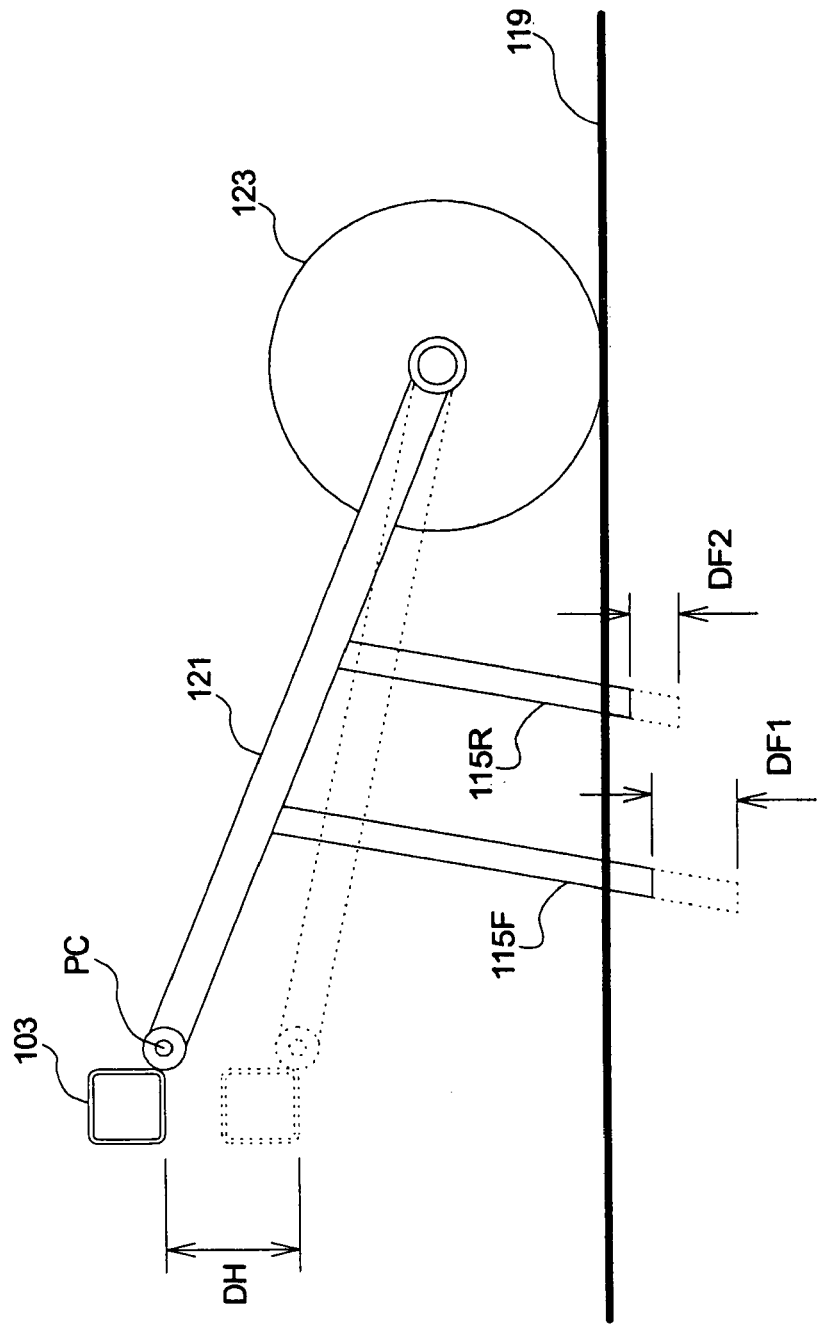
FIG. 6 is a schematic side view of a trailing arm furrow opener of the prior art showing how the furrow depth varies as the frame moves up and down.

Alternatively, in the embodiment of FIG. 4 the front furrow opener 17F' forms a shallow front furrow 16F' with depth DF' into which seed is placed to be packed by the packer wheel 23. The packer wheel 23 is aligned with the front furrow opener 17F', as shown in FIG. 5, instead of with the rear furrow opener 17R as in the embodiment of FIG. 3. The rear furrow opener 17R' forms a deeper furrow 16R' with depth DR' into which fertilizer is deposited and which requires no packing. Thus the separation distance between the seed furrow opener and the packer wheel packing the seed in the seed furrow can be increased considerably without increasing the overall length of the apparatus.

This arrangement may be desirable in some applications or soil conditions as it allows the front furrow opener 17F' to form the seed furrow in undisturbed soil by entering the soil before the following rear furrow opener 17R', and thus increasing the probability that the seed will be placed in the desired location. The seed and fertilizer furrow openers are typically located quite closely together laterally, and it is sometimes difficult to cut the shallower seed furrow in undisturbed soil close beside the deeper fertilizer furrow already present. For example dry soil will sometimes fracture and form lumps when disturbed by the front furrow opener. By cutting the shallower seed furrow in undisturbed ground ahead of the fertilizer furrow opener, and then cutting the deeper fertilizer furrow beside the already formed seed furrow, this problem can be reduced.

Figure 7:
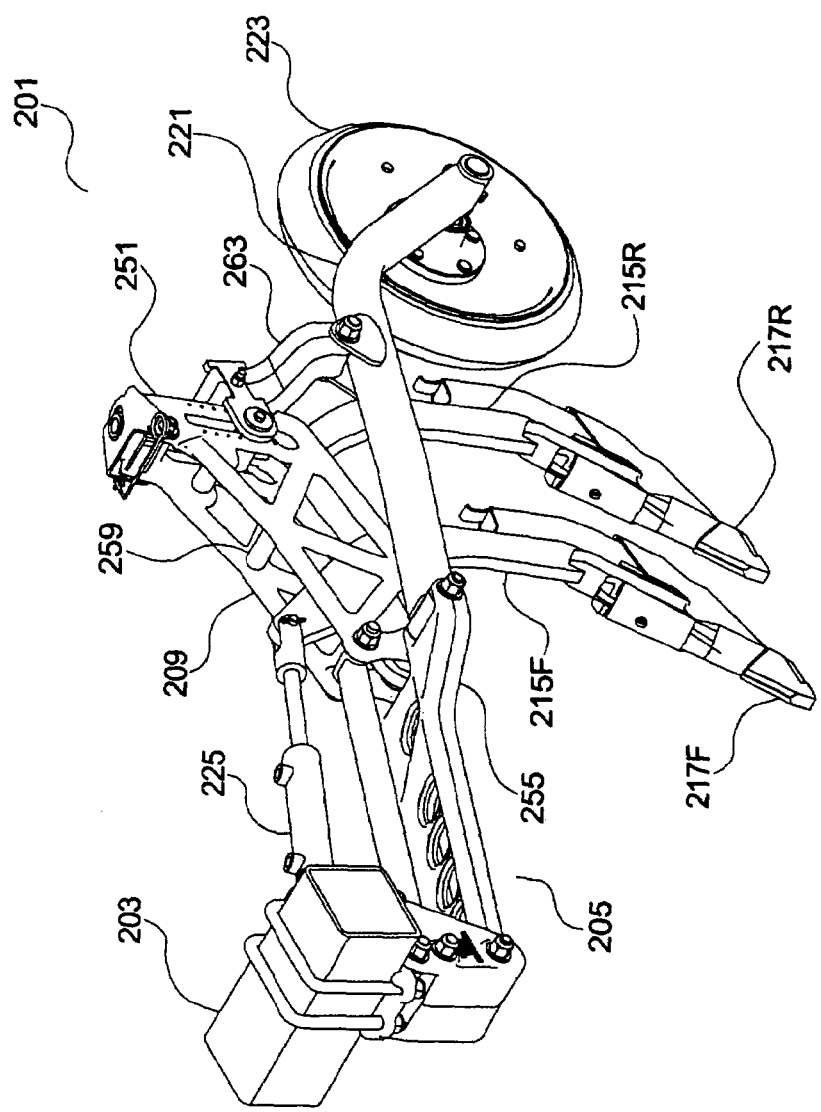
FIG. 7 is a perspective view of an alternate embodiment of the present invention in a working position.
Figure 8:
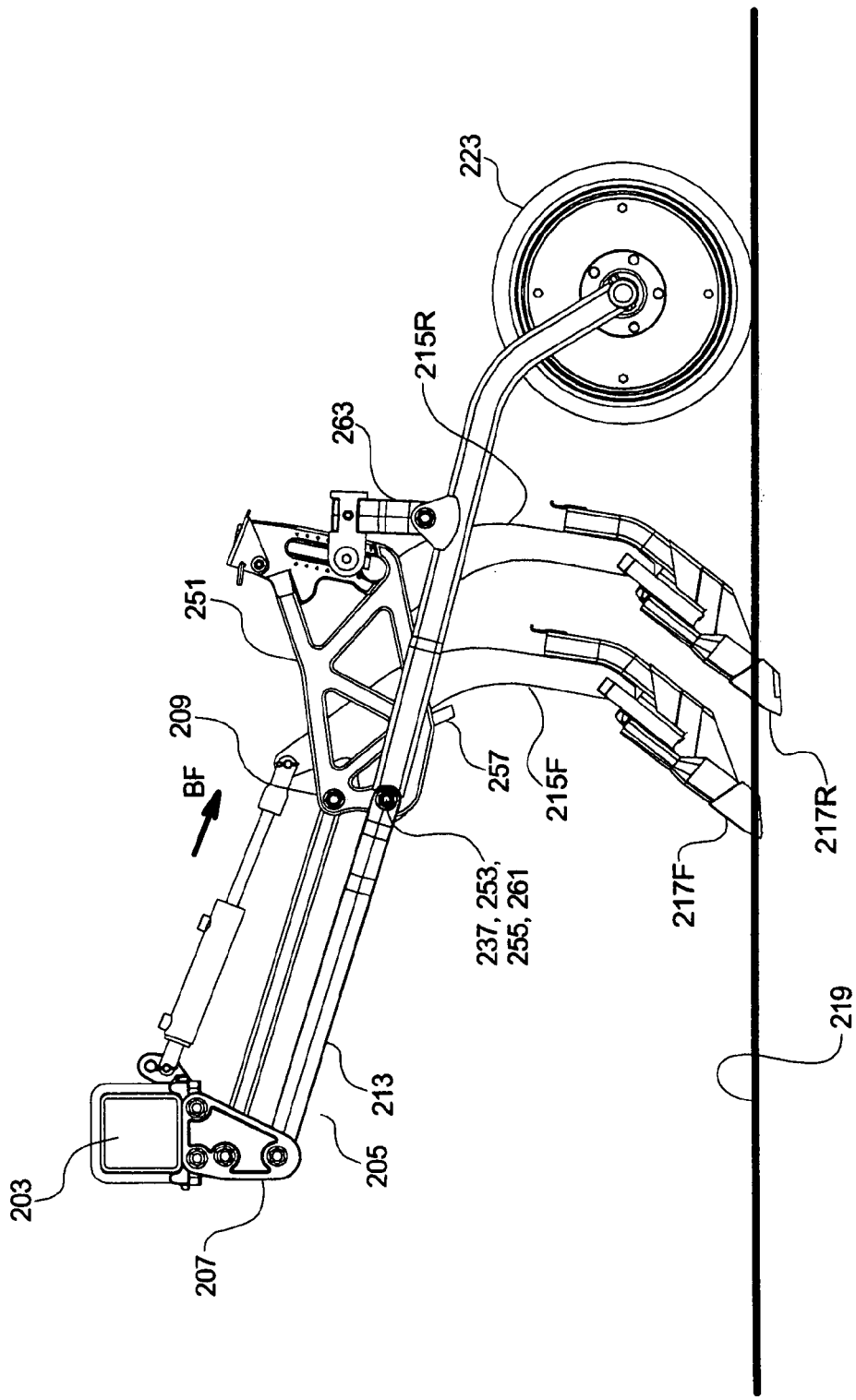
FIG. 8 is a side view of the embodiment of FIG. 7 in a working position.
Figure 9:
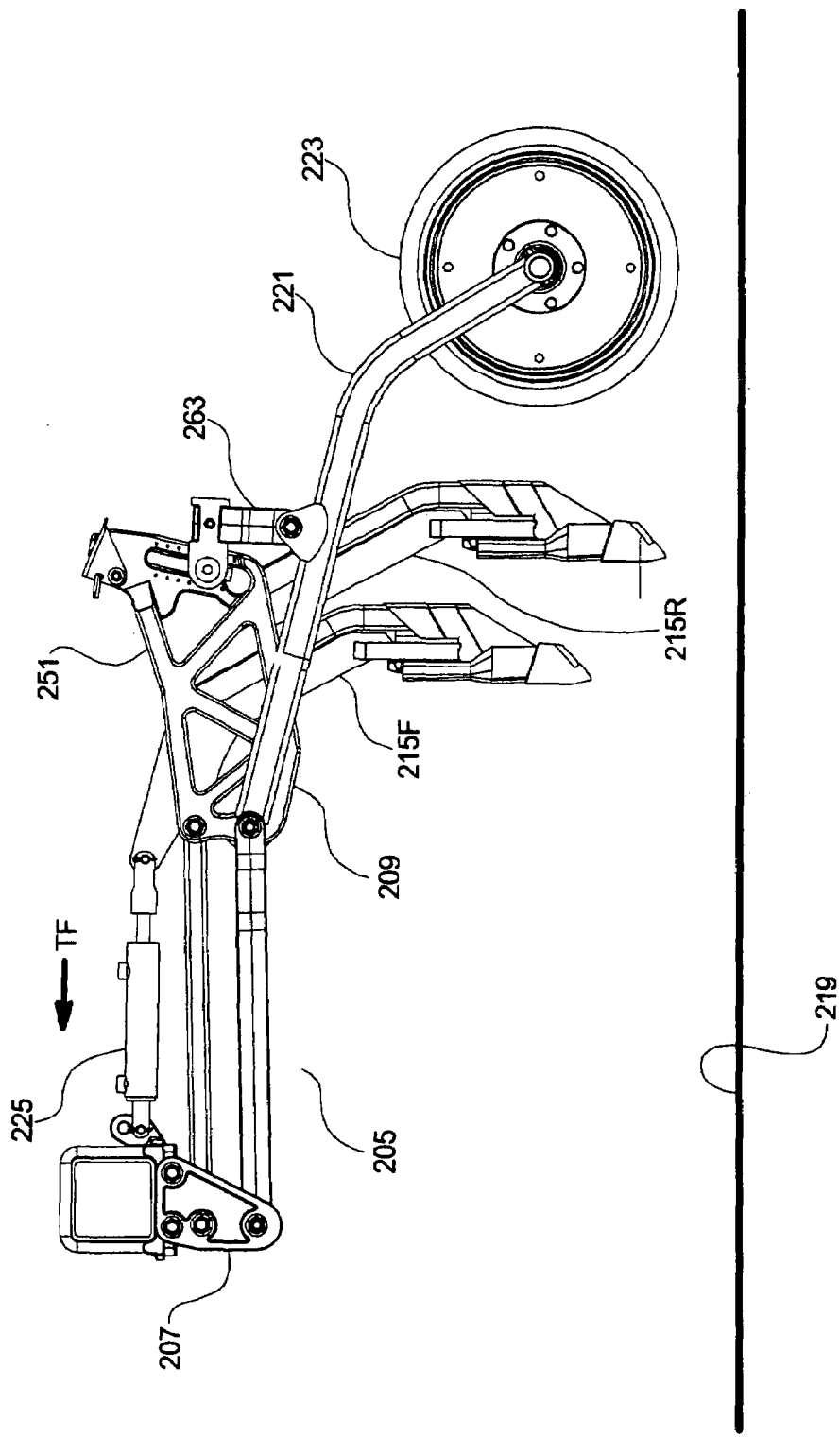
FIG. 9 is a side view of the embodiment of FIG. 7 in a transport position.

An alternate embodiment of the furrow opener apparatus 201 is illustrated in FIGS. 7-9. The parallel link trailing arm 205 comprises a front link 207 attachable to a lateral frame member 203, and the rear link 209 includes an adjustment bracket 251 extending rearward. The front furrow opener bracket 215F is pivotally attached to the rear link 209 about a furrow opener pivot axis 253 which coincides with the lower rear pivot axis 237 of the parallel link trailing arm 205. Thus the bolt 255 serves to mount both the lower arm member 213 and the furrow opener bracket 215 to the rear link 209. Rear furrow opener bracket 215R is attached to the rear link 209 rearward of the front furrow opener bracket 215F and slightly offset therefrom such the front and rear furrow openers 217F, 217R make laterally spaced furrows.

The bias device, hydraulic cylinder 225, is pivotally attached to the front furrow opener bracket 215F. A working stop 257 is provided on the rear link 209 and the front furrow opener bracket 215F moves down to bear against the working stop 257 in response to the bias force BF exerted by the hydraulic cylinder 225 when in the working mode. The bias force BF is transferred by the working stop 257 to the rear link 209 and thus to the rear furrow opener bracket 215R, trailing arm 205, and to the packer wheel 223 to force the packer wheel 223 against the ground 219 as illustrated in FIG. 8. Thus in the working mode the furrow openers 217F, 217R, the packer wheel 223, and the rear link 209 are maintained in substantially rigid orientation with respect to each other by the bias force BF exerted by the hydraulic cylinder 225.

A transport stop 259 is provided on the rear link 209 and the hydraulic cylinder 225 exerts a transport force TF when in the transport mode to move the front furrow opener bracket 215F upward to bear against the transport stop 259 and the transport force TF is transferred by the transport stop 259 to the rear link 209 to raise the rear furrow opener bracket 215R, trailing arm 205, and packer wheel 223 to the transport position above the ground 219 as illustrated in FIG. 9.

The packer wheel arm 221 is pivotally attached to the rear link 209 about a packer wheel arm axis 261, which coincides with the lower rear pivot axis 237 of the parallel link trailing arm 205 and the furrow opener pivot axis 253. The bolt 255 thus conveniently serves also to mount the packer wheel arm 221 to the rear link 209. As can be best seen in FIG. 7, the packer wheel arm 221 is mounted on the outside of the rear link 209 such that the arm 221 extends rearwards and down along side the furrow opener brackets 215F, 215R. The packer wheel 223 is then mounted on the inside of the packer wheel arm 221 and is aligned with the furrow opener 217R so as to follow and pack the furrow.

An adjustable depth brace 263 is attached between the packer wheel arm 221 and the adjustment bracket 251 on the rear link 209 such that a position of the packer wheel arm 221 with respect to the rear link 209 can be adjusted to vary the depth of the furrows.

Figure 10:
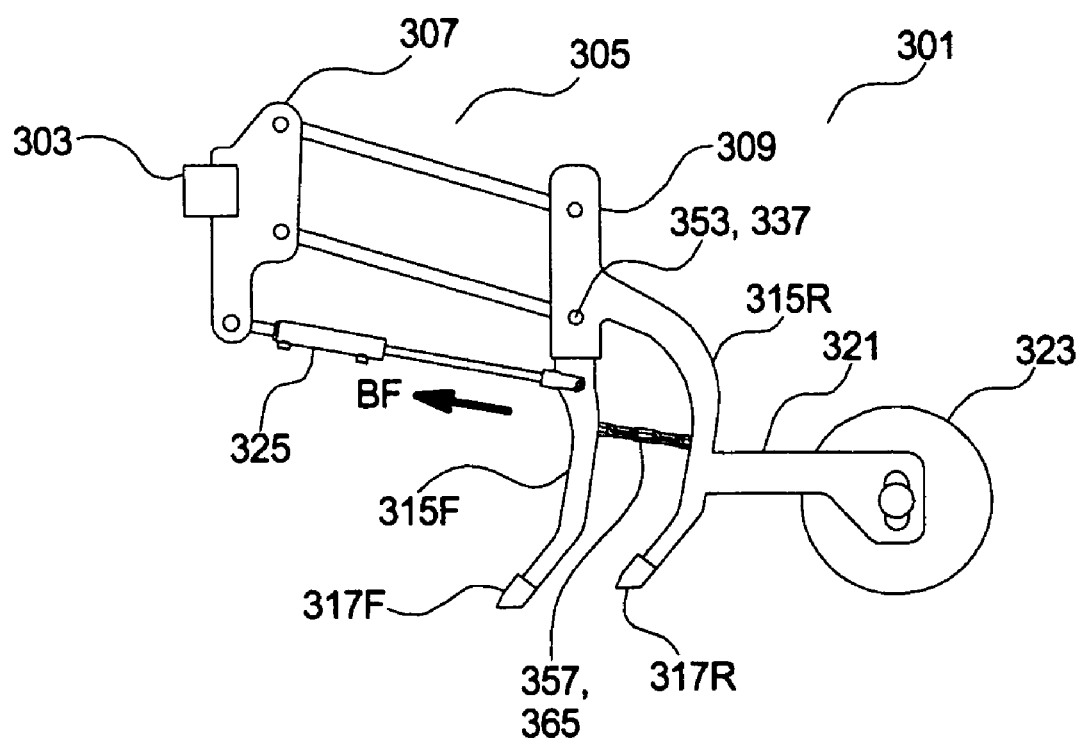
FIG. 10 is a schematic side view of a further alternate embodiment of the present invention in a working position.

A further alternate embodiment of the furrow opener apparatus 301 is illustrated in FIG. 10 that includes front and rear furrow opener brackets 315F, 315R. The parallel link trailing arm 305 comprises a front link 307 attachable to a lateral frame member 303, and a rear link 309. The rear furrow opener bracket 315R is rigidly attached to the rear link by welding, bolts, or the like, or the rear link 309 and rear furrow opener bracket 315R can be formed from a single piece.

The front furrow opener bracket 315F is pivotally attached to the rear link 309 about a furrow opener pivot axis 353 which coincides with the lower rear pivot axis 337 of the parallel link trailing arm 305. The bias device, hydraulic cylinder 325, is located under the parallel link trailing arm 305 and is pivotally attached to the front furrow opener bracket 315F. The working stop 357 is provided by a chain 365 connecting the front and rear furrow opener brackets 315F, 315R. The front furrow opener bracket 315F moves down in response to the bias force BF exerted by the hydraulic cylinder 325 when in the working mode and pulls the chain 365 tight. The bias force BF is transferred by the chain 365 to the rear furrow opener bracket 315R and thus to the rear link 309, trailing arm 305 and the packer wheel 323 to force the packer wheel 323 against the ground. The apparatus 301 moves into transport position in a manner similar to that of the embodiment of FIGS. 7-9.

The packer wheel arm 321 is rigidly attached to the rear link 309 by rigid attachment to the rear furrow opener bracket 315R and the packer wheel 323 is rotatably attached to the packer wheel arm 321 in alignment with a desired one of the front and rear furrow openers 317F, 317R so as to follow and pack the desired furrow. The vertical position of the packer wheel 323 on the packer wheel arm 321 can be adjusted to vary the depth of the furrows.

In the embodiments of FIGS. 7-10 the pivotal attachment of the furrow opener brackets 215F and 315F to the respective rear links, and the downward and rearward angle of the biasing hydraulic cylinders 225, 325. is such that the furrow opener brackets are biased forward as well as downward such that when the furrow openers 217F, 317F strike an obstruction, they can move rearward and upward against the bias force BF to clear the obstruction.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A furrow opener apparatus adapted for attachment to a lateral frame member of an implement for travel over the ground in an operating travel direction, the apparatus comprising:

a parallel link trailing arm comprising a front link adapted for substantially fixed attachment to the lateral frame member, a rear link, and upper and lower parallel arm members pivotally attached to the front and rear links such that the rear link is maintained substantially horizontal as the upper and lower arm members move up and down;

front and rear furrow opener brackets attached to the rear link, and front and rear furrow openers attached to corresponding lower portions of the front and rear furrow opener brackets, the front and rear furrow openers operative to form corresponding front and rear furrows when bottom ends thereof are engaged in the ground;

a packer wheel arm attached to the rear link and extending rearward and downward from the rear link, and a packer wheel rotatably mounted to a rear portion of the packer wheel arm such that the packer wheel is substantially aligned with one of the front furrow opener and the rear furrow opener;

a bias device operative to exert a downward bias force on the trailing arm, front and rear furrow opener brackets, and packer wheel;

wherein the front and rear furrow openers, the packer wheel, and the rear link are maintained in substantially rigid orientation with respect to each other when in a working mode; and wherein a vertical operating position of at least one of the front furrow opener and the rear furrow opener with respect to the packer wheel is adjustable to vary a depth of a corresponding furrow.

2. The apparatus of claim 1 wherein the front link defines upper and lower front pivot axes and the rear link defines upper and lower rear pivot axes, and wherein the attachment to the frame member is such that the upper and lower front and rear pivot axes are oriented substantially horizontal and perpendicular to the operating travel direction, and wherein the upper arm member is pivotally attached to the front link about the upper front pivot axis and pivotally attached to the rear link about the upper rear pivot axis, and wherein the lower arm member is pivotally attached to the front link about the lower front pivot axis and is pivotally attached to the rear link about the lower rear pivot axis such that the upper and lower arm members are oriented substantially parallel to each other.

3. The apparatus of claim 2 wherein the bias device comprises a hydraulic cylinder.

4. The apparatus of claim 3 wherein the hydraulic cylinder is connectable to an active hydraulic source at a first port thereof when in working mode and the active hydraulic source is operative in the working mode to maintain a substantially constant pressure in the hydraulic cylinder to exert a substantially constant downward bias force on the trailing arm, furrow opener bracket, and packer wheel while allowing the hydraulic cylinder to extend and retract in response to forces exerted on the trailing arm.

5. The apparatus of claim 4 wherein the hydraulic cylinder is connectable to the active hydraulic source at a second port thereof when in transport mode and the active hydraulic source is operative in transport mode to raise the trailing arm, front and rear furrow opener brackets, and packer wheel to a transport position.

6. The apparatus of claim 5 wherein a selected one of the front and rear furrow opener brackets is pivotally attached to the rear link about a furrow opener pivot axis, and wherein the hydraulic cylinder is pivotally attached to the selected furrow opener bracket.

7. The apparatus of claim 6 comprising a working stop connected to the rear link and wherein the selected furrow opener bracket moves down to bear against the working stop in response to the bias force exerted by the hydraulic cylinder when in the working mode, and wherein the bias force is transferred by the working stop to the rear link.

8. The apparatus of claim 7 comprising a transport stop connected to the rear link and wherein the hydraulic cylinder exerts a transport force when in the transport mode to move the selected furrow opener bracket upward to bear against the transport stop and wherein the transport force is transferred by the transport stop to the rear link to raise the other furrow opener bracket, trailing arm and packer wheel to the transport position.

9. The apparatus of claim 8 wherein the selected furrow opener bracket is the front furrow opener bracket.

10. The apparatus of claim 6 wherein the furrow opener pivot axis coincides with one of the upper rear pivot axis and the lower rear pivot axis.

11. The apparatus of claim 1 wherein the packer wheel arm is pivotally attached to the rear link about a packer wheel arm axis, and comprising an adjustable depth brace attached between the packer wheel arm and the rear link such that a position of the packer wheel arm with respect to the rear link can be adjusted to vary the depth of the furrows.

12. The apparatus of claim 11 wherein the packer wheel arm axis coincides with one of the upper rear pivot axis and the lower rear pivot axis.

13. The apparatus of claim 1 wherein at least one of the front and rear furrow openers is adjustably mounted with respect to the packer wheel arm such that a position of the at least one furrow opener with respect to the packer wheel can be adjusted to vary the depth of a corresponding furrow.

14. A seeding and fertilizing apparatus comprising:
an implement frame mounted on wheels for travel over the ground in an operating travel direction and comprising a lateral frame member;
a parallel link trailing arm comprising a front link attached substantially rigidly to the lateral frame member, a rear link, and upper and lower parallel arm members pivotally attached to the front and rear links such that the rear link is maintained substantially horizontal as the upper and lower arm members move up and down;
a front furrow opener bracket attached to the rear link, and a front furrow opener attached to a lower portion of the front furrow opener bracket and operative to form a first furrow when a bottom end thereof is engaged in the ground;
a rear furrow opener bracket attached to the rear link, and a rear furrow opener attached to a lower portion of the rear furrow opener bracket and operative to form a second furrow when a bottom end thereof is engaged in the ground;
a packer wheel arm attached to the rear link and extending rearward and downward from the rear link, and a packer wheel rotatably mounted to a rear portion of the packer wheel arm such that the packer wheel is substantially aligned with one of the front and rear furrow openers;
a bias device operative to exert a downward bias force on the trailing arm, front and rear furrow opener brackets, and packer wheel;
wherein the front and rear furrow openers, the packer wheel, and the rear link are maintained in substantially rigid orientation with respect to each other when in a working mode; and
wherein a vertical operating position of at least one of the front and rear furrow openers with respect to the packer wheel is adjustable to vary a depth of an aligned one of the first and second furrows.

15. The apparatus of claim 14 wherein the front link defines upper and lower front pivot axis locations and the rear link defines upper and lower rear pivot axis locations, and wherein the upper and lower front and rear pivot axes are oriented substantially horizontal and perpendicular to the operating travel direction, and wherein the upper arm member is pivotally attached to the front link about the upper front pivot axis and pivotally attached to the rear link about the upper rear pivot axis, and wherein the lower arm member is pivotally attached to the front link about the lower front pivot axis and is pivotally attached to the rear link about the lower rear pivot axis such that the upper and lower arm members are oriented substantially parallel to each other.

16. The apparatus of claim 15 wherein the bias device comprises a hydraulic cylinder.

17. The apparatus of claim 16 wherein the hydraulic cylinder is connected to an active hydraulic source at a first port thereof when in working mode and the active hydraulic source in working mode is operative to maintain a substantially constant pressure in the hydraulic cylinder to exert a substantially constant downward bias force on the trailing arm, front and rear furrow opener brackets, and packer wheel while allowing the hydraulic cylinder to extend and retract in response to forces exerted on the trailing arm.

18. The apparatus of claim 17 wherein the hydraulic cylinder is connected to the active hydraulic source at a second port thereof when in transport mode and the active hydraulic source in transport mode is operative in transport mode to raise the trailing arm, furrow opener bracket, and packer wheel to a transport position.

19. The apparatus of claim 18 wherein the front furrow opener bracket is pivotally attached to the rear link about a furrow opener pivot axis, and wherein the hydraulic cylinder is pivotally attached to the front furrow opener bracket.

20. The apparatus of claim 19 comprising a working stop connected to the rear link and wherein the front furrow opener bracket moves down to bear against the working stop in response to the bias force exerted by the hydraulic cylinder when in the working mode, and wherein the bias force is transferred by the working stop to the rear link.

21. The apparatus of claim 20 comprising a transport stop connected to the rear link and wherein the hydraulic cylinder exerts a transport force when in the transport mode to move the front furrow opener bracket upward to bear against the transport stop and wherein the transport force is transferred by the transport stop to the rear link to raise the trailing arm, rear furrow opener bracket, and packer wheel to the transport position.

22. The apparatus of claim 19 wherein the furrow opener pivot axis coincides with one of the upper rear pivot axis and the lower rear pivot axis.

23. The apparatus of claim 14 wherein the packer wheel arm is pivotally attached to the rear link about a packer wheel arm axis, and comprising an adjustable depth brace attached between the packer wheel arm and the rear link such that a position of the packer wheel arm with respect to the rear link can be adjusted to vary the depth of at least the furrow formed by the aligned furrow opener.

24. The apparatus of claim 23 wherein the packer wheel arm axis coincides with one of the upper rear pivot axis and the lower rear pivot axis.

25. The apparatus of claim 14 wherein an aligned one of the front and rear furrow openers is adjustably mounted with respect to the packer wheel arm such that a position of the aligned furrow opener with respect to the packer wheel can be adjusted to vary the depth of the furrow formed by the aligned furrow opener.

26. The apparatus of claim 14 wherein the packer wheel is aligned with the front furrow opener, and wherein during operation seed is deposited in the first furrow, and fertilizer is deposited in the second furrow.

* * * * *